United States Patent [19]

Grasso et al.

[11] Patent Number: 5,119,229
[45] Date of Patent: Jun. 2, 1992

[54] AMPLIFIER FOR OPTICAL FIBER TELECOMMUNICATION LINES AND OPTICAL FIBER TELECOMMUNICATION LINES INCORPORATING SAID AMPLIFIER

[75] Inventors: Giorgio Grasso, Monza; Aldo Righetti, Milan; Flavio Fontana, Cormano, all of Italy

[73] Assignee: Societa' Cavi Pirelli S.p.A., Milan, Italy

[21] Appl. No.: 602,364

[22] Filed: Oct. 22, 1990

[30] Foreign Application Priority Data

Oct. 24, 1989 [IT] Italy .................. 22120 A/89

[51] Int. Cl.⁵ .......................... H01S 3/30; G02B 6/26
[52] U.S. Cl. ........................................ 359/341; 372/6
[58] Field of Search ............... 330/4.3; 350/96.11, 350/96.15, 96.21, 96.33; 455/610; 372/6; 359/341

[56] References Cited

U.S. PATENT DOCUMENTS

| | | | |
|---|---|---|---|
| 4,556,279 | 12/1985 | Shaw et al. | 350/96.16 |
| 4,674,830 | 6/1987 | Shaw et al. | 330/4.3 |
| 4,712,075 | 12/1987 | Snitzer | 330/4.3 |
| 4,834,481 | 5/1989 | Lawson et al. | 350/96.15 |
| 4,859,016 | 8/1989 | Shaw et al. | 372/6 |
| 4,867,518 | 9/1989 | Sammetz et al. | 350/96.15 |
| 4,906,949 | 3/1990 | Parballe et al. | 350/96.13 |
| 4,938,556 | 7/1990 | Digonnet et al. | 330/4.3 |
| 4,963,832 | 10/1990 | Desurvire et al. | 330/4.3 |

OTHER PUBLICATIONS

Morkel et al.; "An All Fibre, Diode . . . Delay line"; Jun. 3, 1988, Ibe. Colloq., Digest 90, pp. 12/1-4; Abst only.

Primary Examiner—Nelson Moskowitz
Attorney, Agent, or Firm—Brooks Haidt Haffner & Delahunty

[57] ABSTRACT

An optical amplifier (3) in accordance with the invention consists of the assembly of a length of active-core optical fiber (8), single-mode to both pumping and signal optical radiations, and a dichroic coupler (6) which includes two optical fiber lengths (9, 10), both single-mode to pumping and signal optical radiations, coupled to each other over one portion (11) by fusion of the respective claddings and substantial setting in common of the respective cores in the fused portion (11).

12 Claims, 1 Drawing Sheet

AMPLIFIER FOR OPTICAL FIBER TELECOMMUNICATION LINES AND OPTICAL FIBER TELECOMMUNICATION LINES INCORPORATING SAID AMPLIFIER

BACKGROUND OF THE INVENTION

1. Field of the Invention

The present invention relates to an amplifier of the so-called active-core type for optical fiber telecommunication lines and to the optical fiber telecommunication lines incorporating said amplifiers.

2. Description of the Prior Art

So-called active-core amplifiers consist of a length of active-core optical fiber which will be defined in the description that follows and a source of optical pumping radiation which will be defined in the following description as well.

An active-core optical fiber is an optical fiber the core of which, made of silica glass, contains active dopants as hereinafter defined, in addition to the dopants necessary to make said core have a refractive index higher than that of the cladding, that is the radially outermost layer made of silica glass as well.

The above-mentioned active dopants are formed with substances such as rare-earths, erbium and the like for example, which, when excited by optical radiation, known as optical pumping radiation, the wavelength of which depends on the particular dopants selected, have the property of emitting optical radiation, known as emission radiation which has a different wavelength depending however on the particular dopant selected.

Another feature of the active dopants referred to hereinbefore is the fact that, once excited by the optical pumping radiation, they are capable of emitting said optical emission radiation when optical radiation of the same wavelength as the latter impinges on them.

The source of optical pumping radiation is generally a laser and in particular a laser diode capable of emitting optical radiation of the same wavelength as the one required and necessary for exciting the active dopants present in the optical fiber core having an active core as previously defined.

Active-core amplifiers for optical fiber telecommunication lines are already known in the art.

An optical fiber amplifier having an active core for optical fiber telecommunication lines comprises a source of optical pumping radiation optically connected to a dichroic coupler to which one portion of the optical fiber of the transmission or telecommunication line is optically coupled.

In turn the dichroic coupler is directly connected to the optical fiber length having an active core and this first length is in turn connected again to a second optical fiber portion of the transmission or telecommunication line.

In the above known amplifier the source of optical pumping radiation, through the dichronic coupler, sends its own radiation to the length of active-core optical fiber where it causes the excitation of the active dopants present therein.

Also sent to the length of the active-core optical fiber through the dichronic coupler, are the signals to be amplified coming from the first optical fiber portion of the telecommunication line which necessarily must have a wavelength identical to the emission wavelength of the active dopants present in the length of active-core optical fiber.

At the moment at which an optical signal enters the length of the active-core optical fiber it encounters the dopants in an excited condition due to the optical pumping radiation and, for the reason set forth before, a massive emission of optical radiation occurs which has the same wavelength as that of the signal, which brings about, as a result, the amplification of said signal.

In the amplifiers in question and previously described, there is the problem of increasing their yield, defined as the ratio between the obtainable amplification gain and the applied pumping radiation power, while at the same time achieving the benefits of amplifiers on a large scale, capable of offering sufficient reliability so as to enable them to be used in practical applications, such as for example, their easy and safe insertion in optical fiber telecommunication lines.

In the publication "Fourteenth European Conference on Optical Communication" of Sep. 11-15, 1988, on pages 25 to 28, there are the gain values of known amplifiers, which range between 0.14 and 0.31 dB/mW. For the purpose of improving the gain of optical amplifiers, set forth in the same publication are the experimental results of the gain obtained with an optical amplifier made in the laboratory in which the length of the active-core optical fiber, single-mode both to signal and pumping optical radiations, contains erbium as an active dopant. The source of optical pumping radiation used has a wavelength of 980 nm and the optical signal radiation used has a wavelength of 1536 nm.

Even if it has not been specified in the aforementioned publication the dichroic coupler adopted in the optical amplifier hereinbefore described is inevitably a dichroic coupler of the so-called microoptics type, that is a dichroic coupler in which lenses are used in order to be able to introduce the optical pumping and signal radiations into the length of active-core optical fiber. This is due to the fact that dichroic couplers of the other existing types are unable to operate in a satisfactory manner with the particular length of active-core optical fiber in question.

By adopting this known solution a yield of 2.2 dB/mW, intended as the ratio between the gain and the pumping power used, can be reached, which value is interesting. However, that amplifier has the drawback that it is not reliable for use on a large scale due to the particular dichroic coupler adopted therein.

In fact a dichroic coupler of the microoptics type is very delicate in itself and it can hardly be inserted in an optical fiber telecommunication line, which results in unreliability of the telecommunication lines which incorporate such amplifiers.

SUMMARY OF THE INVENTION

The present invention aims at providing optical amplifiers with higher yield than known ones and in particular with a yield up to 4.5 dB/mW, which amplifiers are not only reliable for large scale industrial use, but are also capable of simplifying to the maximum degree the operations necessary for their introduction into the optical fiber telecommunication lines, also making the latter more reliable.

It is therefore an object of the present invention to provide an amplifier for signal-transmitting optical fiber telecommunication lines which can be interposed between one portion of the optical fiber of the line and a second portion of the optical fiber of the line, comprising a source of optical pumping radiation, a dichroic coupler adapted to be connected to the first portion of the line and connected to the source of optical pumping radiation and a length of active-core optical fiber, single-mode to both signal and pumping optical radiations, having one end connected to the dichroic coupler and the other end susceptible of being connected to said second optical fiber portion of the line, said dichroic coupler is of the type comprising two lengths of nonactive-core optical fiber disposed in side by side relation over a portion of their length where they are optically coupled to each other by fusion of the respective claddings and substantial setting in common of the respective cores by stretching the lengths themselves, both said optical fiber lengths forming the dichroic coupler being single-mode both for the optical signal radiation and optical pumping radiation.

It is another object of the present invention to provide an optical fiber telecommunication line comprising at least one signal-transmitting optical fiber portion and at least a second signal-transmitting optical fiber portion optically connected to each other through an optical amplifier interposed therebetween, said optical amplifier comprising a source of optical pumping radiation, a dichroic coupler optically associated with the source of optical pumping radiation and with the first signal-transmitting optical fiber portion of the line, a length of active-core optical fiber, single-mode both to signal and pumping optical radiations downstream of the dichroic coupler and optically connected thereto, said length of active-core optical fiber being also optically connected to the second signal-transmitting optical fiber portion of the line, said dichroic coupler is of the type comprising two lengths of nonactive-core optical fiber disposed in side by side relation over one portion of their length where they are optically coupled to each other by fusion of the respective claddings and substantial setting in common of the respective cores by stretching the lengths themselves, both optical fiber lengths of the dichroic coupler being single-mode both for signal and pumping optical radiations.

BRIEF DESCRIPTION OF THE DRAWINGS

The present invention will be best understood from the following detailed description by way of a non-limiting example with reference to the figures of the accompanying drawing sheet, in which.

DESCRIPTION OF THE PREFERRED EMBODIMENT

Figure 1:
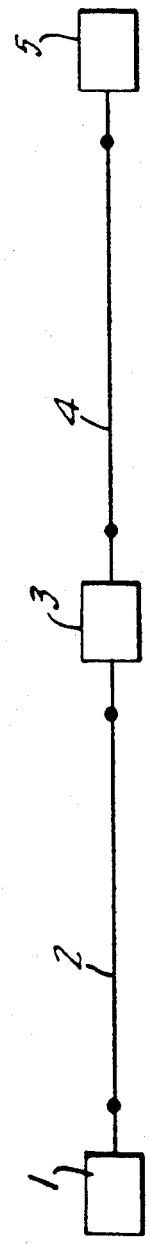
FIG. 1 diagrammatically shows a line in accordance with the invention.

Shown in FIG. 1 is an optical fiber telecommunication line which includes an optical amplifier in accordance with the invention, and therefore an optical fiber telecommunication line in accordance with the invention.

As viewed in FIG. 1, said line comprises a transmitter 1 of any known type, capable of sending optical signals to a signal-transmitting optical fiber, which therefore will not be described herein.

Transmitter 1 has the particular features of incorporating a source of signal-emitting optical radiation, the wavelength of which is adapted for the operation of an optical amplifier such as for example a DFB laser diode capable of emitting an optical radiation having a wavelength of 1536 nm.

However, the above mentioned example of source of optical signal radiation which is the one usually adopted in the optical fiber telecommunication field, is not intended in a limiting sense as regards the scope of the present invention.

Downstream of the transmitter 1 the line comprises one portion 2 of signal transmitting optical fiber which is optically connected at one end thereof to said transmitter.

The first optical fiber portion 2 has the other end optically connected to an optical amplifier 3 according to the invention the characteristics of which will be described in the following.

Downstream of the amplifier 3 and optically coupled thereto there is a second optical fiber portion 4 the characteristics of which are the same as those of the first optical fiber portion 2.

The optical fiber portion 4, one end of which is optically connected to the optical amplifier 3, has the other end optically connected to an optical receiver 5 of any known type, which therefore will not be described.

Figure 2:
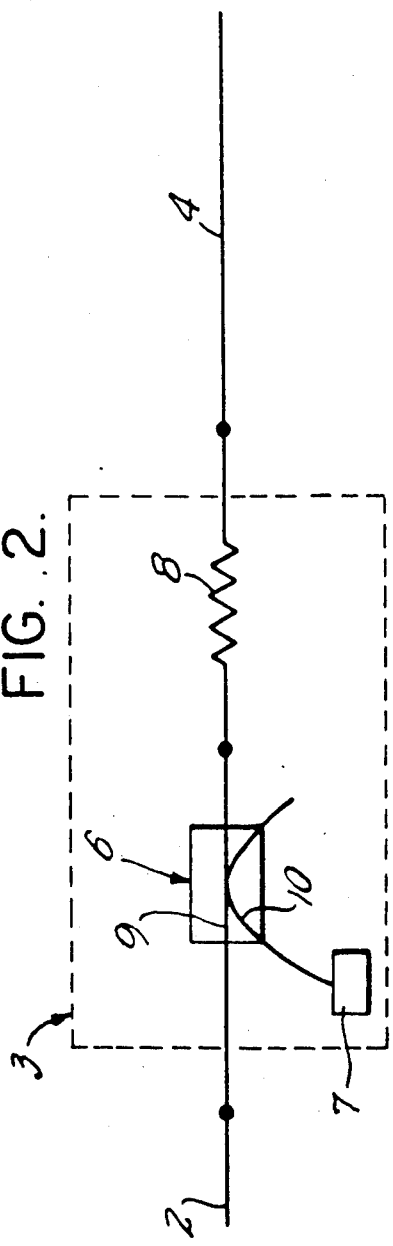
FIG. 2 diagrammatically shows an amplifier according to the invention.

The optical amplifier 3 in accordance with the invention used in the previously described optical fiber telecommunication line in accordance with the invention is diagrammatically shown in FIG. 2.

As viewed in FIG. 2, the optical amplifier includes a particular dichroic coupler 6, which will be described in detail in the description that follows, to which a source 7 of optical pumping radiation is optically coupled as well as a length of active-core optical fiber 8 located downstream of the dichroic coupler 6.

In an optical amplifier in accordance with the invention the length of active-core optical fiber is of the single-mode type both for optical signal radiation and optical pumping radiation.

For example in an optical amplifier according to the invention the length of active-core optical fiber, still containing trivalent erbium uniformly dispersed in said core as an active dopant, has a core diameter of 5.4 $\mu m$. In general the core diameter in the length of the active-core optical fiber is in the range of 5.2 to 5.6 $\mu m$.

On the contrary the cladding outer diameter of the length of active-core optical fiber is for example of 125 $\mu m$, as it is usual in optical fibers.

In the active-core optical fiber the ratio relating to the difference between the refractive index of the core and of the cladding with respect to the refractive index of the cladding, which is generally included between 0.0051 and 0.0058, is 0.0056 for example.

In the above example and when the length of the active-core optical fiber has a cladding made of silica glass and devoid of any dopant and therefore a refractive index of 1.450, the core of said active-core optical fiber has a refractive index of 1.458.

Figure 3:
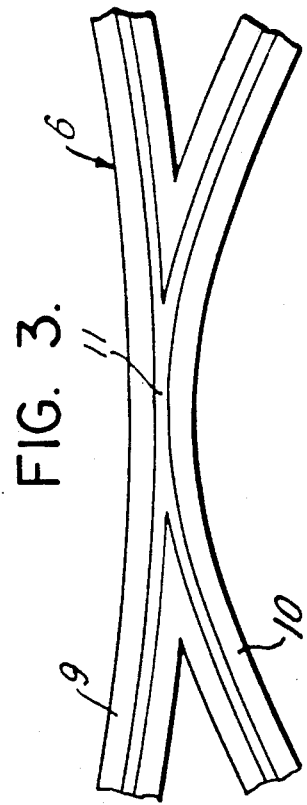
FIG. 3 diagrammatically shows a component of the inventive amplifier.

The dichroic coupler 6 of the amplifier 3 in accordance with the invention, as shown in FIG. 3 on an enlarged scale, consists of two optical fiber lengths 9 and 10, which are both made of silica glass and devoid of active dopants, parallel to each other and coupled by fusion of the respective claddings and stretched immediately afterwards, so that after the operation in the area in which the claddings are joined together by fusion, the cores become substantially coincident over a portion 11 (FIG. 3) thereby practically giving rise to a sole core.

In particular one of the characteristics of a dichroic coupler in an amplifier of the invention is that at the coupling area of the two optical fiber lengths constituting it, where the respective cores are set in common giving rise to a substantially sole core, the diameter of the sole core is smaller than the diameter of the core of each optical fiber length at the ends thereof and in particular that the ratio between the diameter of the substantially common core of the two optical fiber lengths and the diameter of the core of the latter at their ends is from 0.3 to 0.5.

The diameter of the substantially common core of the two optical fiber lengths constituting the dichroic coupler is generally selected of such a value as to cause therein an optical power loss not higher than 1 dB.

Value ranges generally valid for any dichroic coupler of an optical amplifier in accordance with the invention cannot be reported, since in determining the diameter value of the substantially common core adapted for the purposes of the present invention, the particular wavelengths of the optical signal and pumping radiations adopted are factors, which can remarkably vary from one another. However, a technician skilled in the art and only in possession of the above disclosure limiting the power loss not higher than 1 dB, is capable of at least experimentally determining the diameter value of the substantially common core of the two optical fiber lengths in the dichroic coupler.

For example in the case of a 980-nm wavelength of the optical pumping radiation and a 1536-nm wavelength of the optical signal radiation, the diameter of the substantially common core of the two optical fiber lengths is in the range of 1.56 to 2.8μ.

In a dichroic coupler which can be used with an amplifier in accordance with the invention the length of the portion over which the cores of the two optical fiber lengths are substantially in common also depends on the particular wavelengths of the adopted pumping and signal radiations.

Should for example said pumping and signal wavelengths be 980 and 1536 nm respectively, the length of a said portion will be comprised between 0.9 and 1.2 cm. A general standard for determining the length of the above portion is that said length must cause both pumping and signal radiations to be entirely and exclusively conveyed towards only one of the two terminals of the dichroic coupler facing the length of active-core optical fiber. By this sole indication a technician skilled in the art is capable of creating a dichroic coupler having such a characteristic during the construction of the dichroic coupler itself.

In fact, by coupling one of the ends of the two optical fiber lengths to the sources of optical pumping radiation and optical signal radiation respectively, before melting the claddings in the portion in which they are disposed in side by side relation it is possible to stop the stretching applied to said lengths during the fusion of their claddings at the moment at which no optical radiation issues from one of the two other ends, whereas both signal and pumping optical radiations issue from the other of the two other ends.

Another characteristic of a dichroic coupler 6 for an amplifier in accordance with the invention is that the two optical fiber lengths 9 and 10 forming it must be both single-mode to the signal and pumping optical radiations used in the line.

Still another characteristic of a dichroic coupler for an amplifier in accordance with the invention is that the distribution of the nonactive dopants in the core and cladding of the optical fiber component portions must be substantially identical to the distribution of the nonactive dopants present in the length of active-core optical fiber.

As previously indicated, the inventive optical amplifier consists of the assembly of one length of active-core optical fiber having the above stated characteristics and a dichroic coupler in series with the length of active-core optical fiber and as previously described as regards the characteristics thereof.

Preferably in an optical amplifier in accordance with the invention, for the purpose both of achieving an easy and safe coupling to the optical fiber portions of the signal transmitting line and enabling an easy and safe coupling between the two components of the amplifier, there is also the characteristic hereinafter set forth.

The mode diameter to the wavelength of the transmission signals, defined and detectable according to CCITT Rule G 652 of 1986, relating to the optical fiber lengths forming the amplifier and therefore to the length of active-core optical fiber and to the two lengths of optical fibers forming the dichroic coupler is substantially identical to the mode diameter to said signal wavelength of the optical fiber portions of the telecommunication line to which the amplifier is designed to be coupled.

With the above stated features of the components of an amplifier in accordance with the invention, the junction of said components to one another and of them all together to the optical fiber portions of the line is carried out by mere butt melting, that is the ends of the different types of optical fibers involved are joined without practically incurring losses during the couplings.

In particular, as shown in FIG. 2, the coupling between the end of the signal transmitting optical fiber portion 2 of the line is joined by butt welding to one end of the optical fiber length 9 of the dichroic coupler 3.

In turn the other end of the optical fiber length 9 of the dichroic coupler 3 is joined by butt welding to one end of the length of active-core optical fiber 8 the other end of which is joined by butt welding to the portion of the transmission optical fiber 4 of the telecommunication line.

Finally, the source 7 of optical pumping radiation (consisting for example of a In-Ga-As laser diode known per se and capable of emitting a 980-nm optical radiation which is the one used in the case in which the active-core optical fiber is doped with trivalent erbium and the signal is a 1536-nm wavelength optical radiation) is optically coupled to one end of the optical fiber length 10 of the dichroic coupler.

Operation of an amplifier in accordance with the invention and of a line in accordance with the invention incorporating said amplifiers, will be now described with reference to the figures of the accompanying drawing sheet concerning particular embodiments of the invention.

The transmitter 1 of a type known per se and commonly used in optical fiber telecommunication lines emits signals using an optical radiation having a wavelength of substantially 1536 nm which, as is known, is the wavelength for transmission signals enabling the minimum attenuation to be achieved within the transmission optical fibers of the line, identified by reference numerals 2 and 4 in FIG. 1.

Signals sent from transmitter 1 to the portion 2 of optical fiber are at all events subjected to an attenuation while being transmitted therein and they enter the optical fiber length 9 of the dichroic coupler 6 in the amplifier 3 with said attenuation.

Continuously sent to the dichroic coupler 6 and more precisely to the optical fiber length 10 of the same is the pumping optical radiation emitted from the laser diode 7.

The optical pumping radiation which, as previously indicated, is selected by way of example for an amplifier in accordance with the invention and for a 980-nm wavelength line in accordance with the invention, is superimposed in the dichroic coupler to the attenuated optical signal radiation of 1536-nm wavelength, coming from the transmission optical fiber portion 2 of the line.

In particular, the superimposition of the two signal and pumping optical radiations within the dichroic coupler takes place in the region 11 where the two cores of the optical fiber component lengths have been made substantially coincident, as clearly shown in FIG. 3.

Since the two optical fiber lengths 9 and 10 forming the dichroic coupler 3 are both single-mode to both signal and pumping optical radiations, both optical radiations issuing from the dichroic coupler are superimposed and single-mode.

In addition, with the use of a dichroic coupler in which the distribution of nonactive dopants is identical to that of the nonactive dopants existing in the length of active-core optical fiber, losses of optical energy in the optical radiations summed to each other in the amplifier do not occur.

In particular, both signal and pumping radiations sent to the input of the dichroic coupler come out of the same (due to its above stated characteristics) only along the optical fiber length 9 facing the length of active-core optical fiber 8 and, since the distribution of nonactive dopants is the same in the components of the dichroic coupler and in the length of active-core optical fiber, no loss can occur when said components are coupled, as no alteration in the single-mode distribution of power of the two optical radiations can take place in the junction area of said components.

From the foregoing it results that entering the length end of the active-core optical fiber 8 facing the dichroic coupler 3 are simultaneously and without losses both the whole optical pumping radiation with its utmost power and the optical signal radiation attenuated by effect of its passage through the optical fiber portion 2 but with the utmost power when the latter comes out of said optical fiber 9.

Since, as above said, the distribution of the nonactive dopants in the optical fiber lengths forming the coupler is substantially identical to that of the nonactive dopants present in the length of active-core optical fiber, neither does alteration occur in the optical radiations during the passage of the same from the dichroic coupler to the length of active-core optical fiber.

In addition, due to the fact that the length of the active-core optical fiber is also single-mode both to pumping and signal optical radiations, the input and spreading of both radiations therein takes place so that the power distribution of said radiations is kept symmetric relative to the axis of the length of active-core optical fiber.

The optical pumping radiation passing through the core of the active-core optical fiber length 8 causes the excitation of the active dopant present therein. Said active dopant excited by the optical pumping radiation, at the instant at which it is hit by the optical signal radiation, emits a radiation having the same wavelength, which results in the amplification of the optical signal.

The optical signal so amplified is sent to the portion of transmission optical fiber 4 of the line and reaches the receiver 5.

Experimental tests have been carried out with an amplifier in accordance with the invention and the test modalities as well as the results achieved will be set forth in the following.

The particular inventive amplifier submitted to experimental tests has the following structure.

The length of active-core optical fiber adopted is of the step index type and is devoid of nonactive dopants in the cladding which is made of silica glass and therefore has a 1.45 refractive index, whereas it contains germanium in the core as a nonactive dopant, to an amount sufficient to give it a 1.458 refractive index; in addition said length of active-core optical fiber has a 5.4 $\mu$m core diameter and a 125 $\mu$m outer diameter of the cladding.

The core of the active-core optical fiber length in question besides containing the above stated nonactive dopants, also contains trivalent erbium ions as the active dopant, which are uniformly dispersed in said core with a concentration of 0.3% by weight, expressed as erbium oxide.

Finally the length of active-core optical fiber used in the experimental test is 8 m long.

The dichroic coupler used has the two optical fiber component lengths equal to each other, of the index step type, made of silica glass and both single-mode both to the optical signal radiation and to the optical pumping radiation in which the nonactive dopant content and distribution is identical to that of the nonactive dopants of the active-core optical fiber length.

In particular in said optical fiber lengths forming the particular dichroic coupler used, the diameters and refractive indices for the core and the cladding are the same as those for the length of active-core optical fiber. In addition, the portion of mutual coupling between the two optical fiber lengths where said optical fibers have substantially coincident the respective cores is 0.9 cm long and the diameter of the core where said core is substantially in common for both optical fiber lengths is 2.1 $\mu$m.

Finally the ratio between the diameter of the core substantially common to the two optical fiber lengths forming the dichroic coupler and the diameter of the core of the same lengths at their ends is 0.4.

The optical pumping radiation source used is an In-Ga-As laser diode emitting a continuous optical radiation of 980-nm wavelength and 6-mW power.

In the experimental test two optical fiber portions of the type normally used in optical fiber telecommunication lines with a mode diameter to the signal radiation equal to that of the optical fiber lengths forming the amplifier have been also adopted.

For the experimental test, used as the source of optical signal radiation has been a DFB laser diode emitting an optical radiation of 1536-nm wavelength with a 100-mW power and for which the portions of signal transmitting optical fibers are single-mode only for the signal optical radiation and multimode for the pumping optical radiation.

The above listed different components have been assembled as follows.

The source of optical signal radiation has been optically coupled to the end of a signal transmitting optical fiber portion so that practically the whole radiation issued from the signal source is introduced into said optical fiber portion.

The other end of the above cited optical fiber portion has been joined by butt welding to the end of one of the optical fiber lengths of the dichroic coupler.

In addition the source of optical pumping radiation as above specified has been coupled to the end of the optical fiber length of the dichroic coupler disposed in side by side relation to the length to which the portion of signal transmitting optical fiber has been joined so that the whole power issued therefrom, which is 6 mW, penetrates into the optical fiber portion of the dichroic coupler in question.

Connected by butt welding to the end of the optical fiber length of the dichroic coupler from which both signals are capable of coming out, is one end of the active-core optical fiber length the characteristics of which have been previously stated.

Butt welded to the other end of the length of active-core optical fiber is one end of the other portion of signal transmitting optical fiber.

The apparatus for carrying out the experimental tests has been completed by coupling the end of the signal transmitting optical fiber portion opposite that directly coupled to the length of active-core optical fiber to an intensity detector designed to detect the intensity of the radiation coming out of said optical fiber portion, in particular to a PIN photodiode.

From the experimental tests carried out it has been possible to notice that by using a pump source emitting a 980-nm wavelength pumping radiation with a 6-mW power, the obtained gain for the adopted optical signal radiation, which is 1536 nm, is 25 dB.

It results therefore from the experimental tests that the obtained yield, expressed as a ratio between the gain and the power of the optical pumping radiation used, is 4.1 dB/mW.

Since the maximum yield which can be reached with the known amplifiers of the type in question appears to be 2.2 dB/mW, as can be drawn from the relevant literature, the results achieved with the experimental tests prove that the present invention has reached the previously stated purpose of improving the yield of said amplifiers by 100%.

Furthermore, from the above description of the particular embodiments it also appears that the accomplishment of an amplifier in accordance with the invention, as well as its insertion in an optical fiber telecommunication line, are easy and very reliable since they can be achieved by merely butt welding the involved optical fibers.

While a particular embodiment of an amplifier and a line in accordance with the invention has been described and illustrated, all possible variations accessible to a person skilled in the art are intended to be comprised within the scope of the claimed invention.

We claim:

1. An amplifier for amplifying optical communication signals of a predetermined wavelength transmitted over an optical fiber telecommunication line and which can be interposed between and interconnect one portion of the line and another portion of the line, said amplifier comprising:

an optical pumping energy source for providing pumping energy at a predetermined wavelength;

a length of active-core optical fiber with cladding around a core and which is single-mode for both said communication signals and said optical pumping energy, the core of said active-core optical fiber containing a dopant which provides ions which can be pumped to a laser emission level by said optical pumping energy source and which when subjected to energy at said predetermined communication signal wavelength drop to a level lower than said laser emission level and emit energy at said predetermined communication signal wavelength, said length of active core optical fiber having an input and an output, the latter output being connectible to said another portion of said line;

a dichroic coupler comprising two non-active lengths of optical fiber with cladding around a core and disposed in side-by-side relation over a portion of their lengths at which the core of one length of non-active optical fiber is optically coupled to the core of the other of the lengths of non-active optical fiber by fusion of the claddings and stretching of said non-active lengths to form a substantially common core, each of said non-active lengths being single-mode for both said communication signals and said optical pumping energy and having an input at one side of said portion of the length thereof and an output at the other side of the last-mentioned said portion, the input of one of said non-active lengths being connectible to said one portion of said line and the input of the other of said non-active lengths being connected to said optical pumping energy source and the output of one of said non-active lengths being connected to said input of said length of active-core optical fiber; and said amplifier being without means for positive feedback of energy at said predetermined communication signal wavelength from one part of said active core optical fiber to another part thereof.

2. An amplifier according to claim 1 wherein said dopant is erbium.

3. An amplifier according to claim 1 wherein said cladding and said core of said active-core optical fiber contain non-active dopants and said cladding and said core of said non-active lengths of optical fiber contain non-active dopants in the same amounts as the non-active dopants contained in the cladding and core of said active-core optical fiber.

4. An amplifier according to claim 1 wherein the ratio of the diameter of said common core to the diameter of the core of each of said non-active lengths at their ends is from 0.3 to 0.5.

5. An amplifier according to claim 1 wherein the mode diameter of said non-active lengths is substantially equal to the mode diameter of the optical fiber of at least said one portion of said line.

6. An amplifier according to claim 1 wherein said common core has a diameter in the range of $1.56\mu$ to $2.8\mu$, said predetermined wavelength of said optical signals is 1536 nm and said predetermined wavelength of pumping energy is 980 nm.

7. An optical fiber telecommunication system comprising the amplifier set forth in claim 1 and further comprising:

a source of optical communication signals at said predetermined wavelength thereof;

a first optical telecommunication fiber line interconnecting said source of optical communication signals and said one input of said non-active lengths; and a second optical telecommunication fiber line connected to said output of said length of active-core optical fiber.

8. An optical fiber telecommunication system according to claim 7 wherein said dopant is erbium.

9. An optical fiber telecommunication system according to claim 7 wherein said cladding and said core of said active-core optical fiber contain non-active dopants and said cladding and said core of said non-active lengths of optical fiber contain non-active dopants in the same amounts as the non-active dopants contained in the cladding and core of said active-core optical fiber.

10. An optical fiber telecommunication system according to claim 7 wherein the ratio of the diameter of said common core to the diameter of the core of each of said non-active lengths at their ends is from 0.3 to 0.5.

11. An optical fiber telecommunication system according to claim 7 wherein the mode diameters of said first optical telecommunication fiber line and of said second optical telecommunication fiber line are substantially equal and the mode diameter of said non-active lengths is substantially equal to the mode diameters of said first and said second optical telecommunication fiber lines.

12. An optical fiber telecommunication system according to claim 7 wherein said common core has a diameter in the range of 1.56μ to 2.8μ, said predetermined wavelength of said optical signals is 1536 nm and said predetermined wavelength of pumping energy is 980 nm.

* * * * *